Dec. 6, 1949     H. W. SCHULTZ     2,490,548
METHOD OF MAKING COMPOSITE ARTICLES
Filed July 7, 1945

INVENTOR
HAROLD W. SCHULTZ
BY
his ATTORNEYS

Patented Dec. 6, 1949

2,490,548

UNITED STATES PATENT OFFICE 2,490,548

METHOD OF MAKING COMPOSITE ARTICLES

Harold W. Schultz, Dayton, Ohio, assignor to General Motors Corporation, Detroit, Mich., a corporation of Delaware Application July 7, 1945, Serial No. 603,597

3 Claims. (Cl. 29—189)

This invention relates to composite articles and particularly to a method of making same and is particularly directed to a method of applying a layer of metal to a supporting metal backing such as steel, wherein the metal layer is mechanically interlocked and in some cases, metallurgically bonded to the metal backing.

It is therefore, an object of this invention to provide a method whereby a metal layer may be mechanically interlocked with a layer of another metallic material and, in some cases, metallurgically bonded thereto.

In carrying out the above object, it is a further object to utilize a strong metal backing material which has the surface thereof knurled to provide a plurality of pyramidal knurls which are compressed to flatten the peak portions only thereof whereby the knurls resemble mushrooms. A layer of another metal is then sprayed, cast or rolled onto this flattened knurled surface whereby portions of the sprayed, cast or rolled-in material fill the depressions between the knurls and are interlocked with the base material mechanically due to the reentrant angles beneath the mushroomed portions of the knurls. In some cases, it is a further object to effect a metallurgical bond between the base metal and the overlay through an inter-metallic diffusion therebetween which is occasioned by the heat treatment during the casting operation or by means of a subsequent heat treatment step.

Further objects and advantages of the present invention will be apparent from the following description, reference being had to the accompanying drawings wherein preferred embodiments of the present invention are clearly shown.

In the manufacture of composite material and especially in the manufacture of material for rubbing contact, such as, bearings, clutches and the like, it is desirable to have a strong metal backing member as a support, which member is overlayed with and carries a surface of another metal having the desired frictional characteristics. In this connection, babbitts form very satisfactory surfaces as does aluminum and the like. These metals are most effectively used when supported and carried by a strong metal backing such as steel, bronze or other suitable metal etc. In many instances, it is difficult to obtain a metallurgical bond between the friction or anti-friction surfaces and the backing member since, as in the case case of aluminum, a brittle aluminum-iron bonding layer is usually formed which is undesirable. Numerous expedients have been proposed for interlocking the friction or anti-friction surface to the steel whereby a satisfactory bond can be formed. This invention is primarily directed to a method for particularly effecting a mechanical and/or metallurgical bond between the friction and anti-friction surface and strong metal backing member or support.

Figure 1:
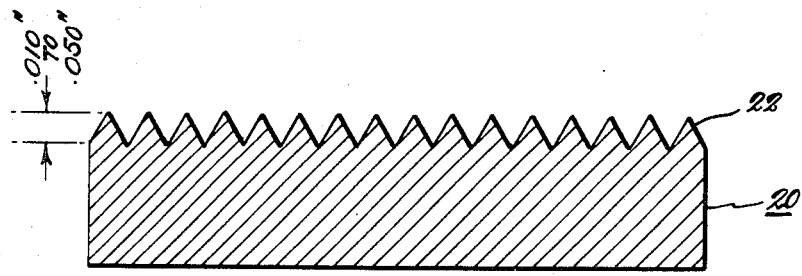
Fig. 1 is a view in cross section of a portion of material showing one type of knurl.
Figure 2:
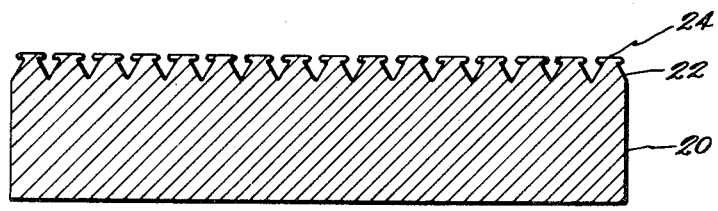
Fig. 2 is a view of the knurls after a selective compression operation wherein the peaks of the knurls are flattened or mushroomed.
Figure 3:
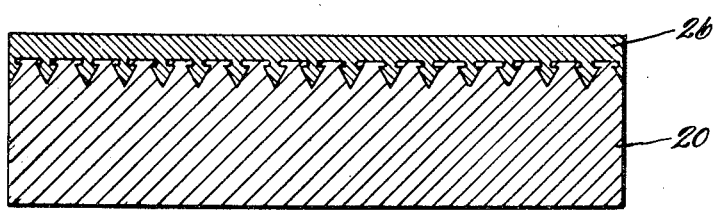
Fig. 3 is a view of the composite material showing the overlay of metal mechanically interlocked with the knurled supporting member and Fig. 4 is a view on a greatly enlarged scale of another embodiment of the invention wherein the overlay has been machined off to expose the mushroomed peaks of the knurls for forming a variegated surface of the base metal and the applied metal.
Figure 4:
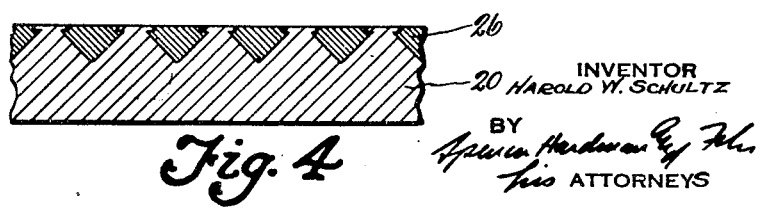

Referring to the drawings, Fig. 1 shows a bronze or copper clad steel member wherein the surface of the member has been knurled as at 22, wherein the knurls are preferably from 010" to .050" in height. Iron, steel, copper, bronze, nickel etc., and alloys may all be used as supporting members and may be knurled by well known practices. The knurls 22 are preferably of a conical or pyramidal shape terminating in rather sharp apices. This supporting member is then compressed under sufficient pressure to mushroom the peaks or apices of the knurls 22 as shown at 24 in Fig. 2. This forms a flat surface having depressions therein with reentrant angles between the knurls 22. This surface is now prepared for the application of a metal having desirable friction or anti-friction characteristics, and, in this case, any metal that can be cast below the melting point of the support or which can be sprayed, or any metal more ductile than the support which can be rolled hot or cold as disclosed in application Serial No. 603,599 filed concurrently herewith, may be used as dictated by the final application of the composite member. For example, babbitt can be cast directly onto the surface of the supporting member 20 wherein portions of the babbitt flow into the interstices between the knurls 22 and preferably wherein the babbitt forms an overlay as at 26. When the babbitt is solidified, the portions thereof with the interstices act as mechanical interlocks, due to the mushroomed peaks 24 of knurls 22.

In the casing of spraying, it is possible to spray metal of any desirable type directly onto the surface of the support 20 wherein a high velocity spray is utilized for driving particles of the sprayed metal into the interstices and finally building up a satisfactory overlay over the surface of the peaks 24. In the case of sprayed metal, it is often desirable to anneal the material to homogenize the sprayed metal layer by making the layer substantially continuous and non-interrupted and simultaneously cause the layer to metallurgically bond to a predetermined degree to the surface of the knurls. In this manner, a very strong interlock is obtained.

In some cases it may be desirable to form a rubbing surface wherein portions of the supporting metal show through similar to the material disclosed in the Boegehold Patent 2,198,240. In this instance, it is desirable that the backing member be formed of a material that has desired frictional characteristics. Obviously, the mushroomed portions of the peaks of the knurls should not be entirely machined off or the interlock will be reduced. However the area of base metal showing through can be readily predetermined by changing the shape of the knurls, that is to say, by changing the apex angle thereof whereby the knurls may be spaced as desired. The annealing temperatures are well known in the art for various metals. For example, temperatures between 500° F. and 1000° F. for aluminum for periods of time ranging from 2 or 3 hours to 30 minutes.

From the foregoing it is apparent that I have provided a method for forming composite articles wherein the different metals within the article are firmly interlocked together.

While the embodiments of the present invention as herein disclosed, constitute preferred forms, it is to be understood that other forms might be adopted, all coming within the scope of the claims which follow.

What is claimed is as follows:

1. The method for making composite articles for subsequent use as bearings, the steps of; providing a strong metal backing member, knurling one surface of said member for providing a plurality of peaked knurls, uniformly compressing the peaks of said knurls for mushrooming said peaks without appreciably distorting the knurls whereby cavities are formed between the knurls which have reentrant angles at the interstices thereof, spraying metal selected from the group of bearing metals consisting of aluminum, aluminum alloys and babbitts onto said knurled surface for completely covering the surface, and for filling the cavities between the knurls, heating the backing member with the sprayed metal thereon for a time and at a temperature sufficient to improve the bond between the sprayed metal and the backing member, and then machining off the sprayed metal to expose a predetermined area of the mushroomed surfaces of said knurls whereby the knurled surface is in a non-continuous phase surrounded by the sprayed metal in a continuous phase.

2. The method for making composite articles for subsequent use as bearings, the steps of; knurling one surface of a strong metal backing member selected from that class consisting of steel, steel coated with copper, copper, bronze and nickel, spraying aluminum onto said knurled surface, heating the backing member with the sprayed aluminum thereon at a temperature of from 500° to 1000° F., for from one-half hour to three hours to homogenize the aluminum layer and bond it to the surface of the backing member, and finally machining the aluminum surface into a smooth bearing surface.

3. The method as claimed in claim 2 wherein the machining step is carried out to a point where the mushroomed peaks of the knurls are partially exposed.

HAROLD W. SCHULTZ.

REFERENCES CITED

The following references are of record in the file of this patent:

UNITED STATES PATENTS

| Number | Name | Date |
|---|---|---|
| 664,438 | Sargent | Dec. 25, 1900 |
| 1,148,223 | Feeser | July 27, 1915 |
| 1,302,504 | Klocke | May 16, 1919 |
| 1,442,445 | Romano | Jan. 16, 1923 |
| 1,603,470 | Johnson et al. | Oct. 19, 1926 |
| 1,729,747 | Palm | Oct. 1, 1929 |
| 2,050,993 | Bush | Aug. 11, 1936 |
| 2,241,789 | Queneau | May 13, 1941 |
| 2,375,068 | Bennett | May 1, 1945 |
| 2,382,384 | Cito | Aug. 4, 1945 |